United States Patent
Moriwaki et al.

(10) Patent No.: US 6,333,124 B1
(45) Date of Patent: Dec. 25, 2001

(54) METAL OUTER CAN FOR A BATTERY AND METHOD OF MANUFACTURING SAME

(75) Inventors: Yoshio Moriwaki; Akira Iwase; Susumu Kitaoka, all of Hirakata; Isao Matsumoto, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/254,365

(22) PCT Filed: Aug. 3, 1998

(86) PCT No.: PCT/JP98/03465

§ 371 Date: Mar. 4, 1999

§ 102(e) Date: Mar. 4, 1999

(87) PCT Pub. No.: WO99/08332

PCT Pub. Date: Feb. 18, 1999

(30) Foreign Application Priority Data

Aug. 5, 1997 (JP) ................................................... 9-224282

(51) Int. Cl.[7] .............................. H01M 2/02; H01M 2/00; H01M 6/00
(52) U.S. Cl. ........................ 429/176; 29/623.1; 429/166; 429/163
(58) Field of Search ........................ 29/623.1; 429/163, 429/164, 166, 176

(56) References Cited

U.S. PATENT DOCUMENTS

| | | | |
|---|---|---|---|
| 5,840,441 | * | 11/1998 | Hirofumi et al. ................... 429/176 |
| 5,993,994 | * | 11/1999 | Ohmura et al. ..................... 429/176 |
| 6,001,504 | * | 12/1999 | Batson et al. ...................... 429/163 |
| 6,007,936 | * | 12/1999 | Iwase et al. ......................... 429/94 |
| 6,040,082 | * | 3/2000 | Haas et al. ......................... 429/163 |
| 6,040,083 | * | 3/2000 | Hikata et al. ...................... 429/169 |
| 6,087,040 | * | 7/2000 | Ohmura et al. ................... 429/176 |

FOREIGN PATENT DOCUMENTS

| | | | |
|---|---|---|---|
| 0822266A1 | * | 4/1998 | (EP) . |
| 1-95464 | | 4/1989 | (JP) . |
| 1-313848 | | 12/1989 | (JP) . |
| 2-150660 | | 12/1990 | (JP) . |
| 7-3395 | | 1/1995 | (JP) . |
| 7-99686 | | 10/1995 | (JP) . |

* cited by examiner

Primary Examiner—Carol Chaney
Assistant Examiner—Tracy Dove
(74) Attorney, Agent, or Firm—Jordan and Hamburg LLP

(57) ABSTRACT

A battery has elements for electromotive-force accommodated in a metal outer can which has a bottom having a cylindrical, prismatic or similar shape. The ratio of the bottom thickness (TA) the side thickness (TB) is 1.5–7.0. The metal outer can contains primarily iron and a layer of nickel is provided on at least the inner face of the battery. Shallow grooves are formed on the nickel layer perpendicular to the bottom face. An iron-based metallic sheet formed with a nickel layer on at least one face is subjected to drawing forming into a tubular shape having a bottom, continuous ironing processing being performed such that the side of the can formed in the tubular shape has an ironing ratio in the range of 20% to 90% and a metal outer can is thereby manufactured having a ratio of a bottom thickness to its side thickness from 1.5 to 7.0, having a cylindrical shape, prismatic shape or shape similar thereto, and with shallow longitudinal grooves formed in a nickel layer provided on the battery inside face.

26 Claims, 6 Drawing Sheets

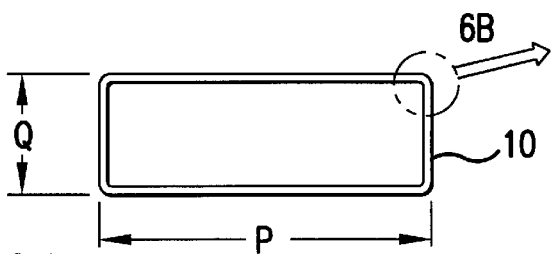
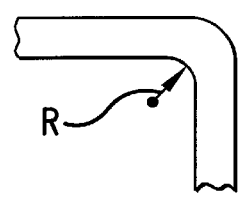
FIG.6A
FIG.6B
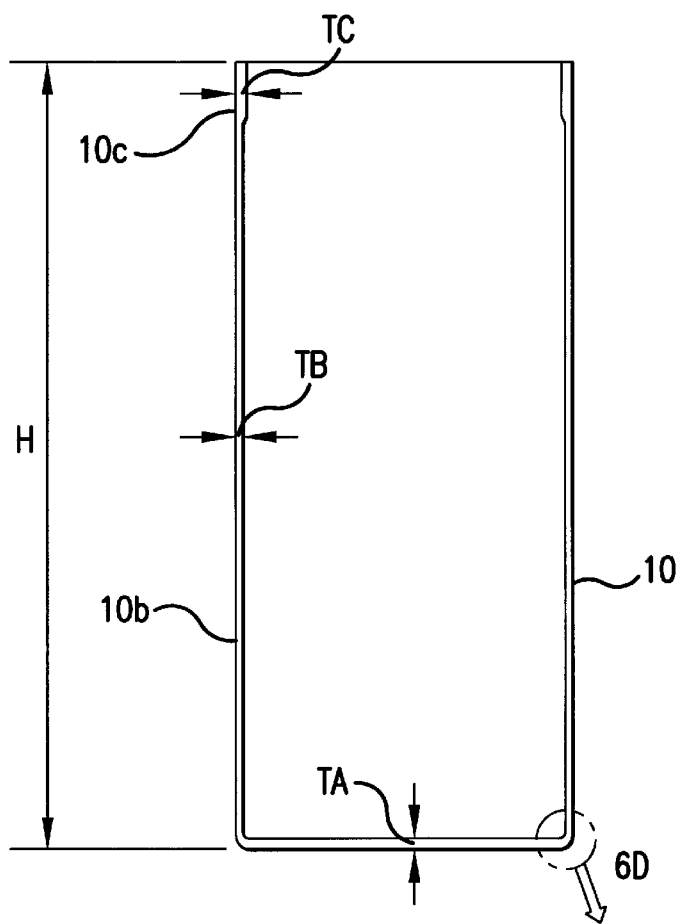
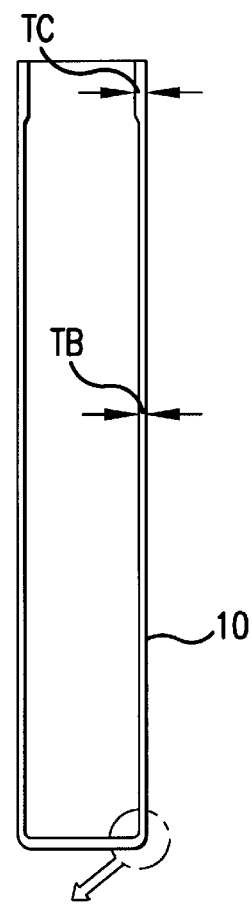
FIG.6
FIG.6C
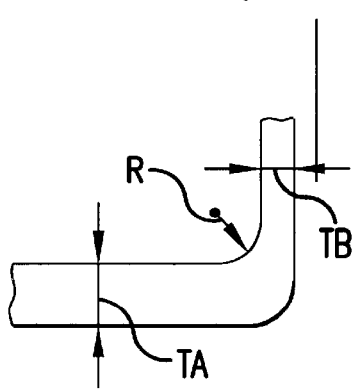
FIG.6D

METAL OUTER CAN FOR A BATTERY AND METHOD OF MANUFACTURING SAME

BACKGROUND

The present invention relates to a battery such as a primary battery or secondary battery and in particular relates to improvements in a metal outer can for a battery having a cylindrical or prismatic shape.

In recent years, as portable equipment has become increasingly common, the demand for miniature primary batteries and secondary batteries has grown. As primary batteries, manganese dry batteries or alkali manganese dry batteries or lithium batteries are primarily used, depending on the respective application. Also, as secondary batteries, considerable use has previously been made of nickel-cadmium accumulators constituting alkali accumulators in which an aqueous solution of alkali is employed as electrolyte and nickel-hydrogen rechargeable batteries, in which a hydrogen-absorption alloy is employed as negative electrode. Recently however, lithium ion secondary batteries using an organic electrolyte, which have the characteristic advantage of light weight, have suddenly appeared on the market.

In addition to the cylindrical and coin-shaped types, which were the typical shapes conventionally used for batteries, principally miniature secondary batteries for portable equipment, in recent years use of prism shaped batteries has started to increase and, in addition, paper-form thin batteries are currently starting to appear. An important recent trend regarding the performance demanded for these batteries is increased energy density of the battery. Speaking in general terms, there are two ways of indicating battery energy density. One of these is volume energy density (Wh/l); this is employed as an index of miniaturization of the battery. Another is weight energy density (Wh/kg); this is employed as an index of weight reduction of the battery.

Such batteries having high volume energy density (Wh/l) or weight energy density (Wh/kg), which are indices of miniaturization and weight reduction, are prized by market demand and there is fierce competition regarding battery energy density in all battery types.

What primarily determines the level of battery energy density are the battery active materials of the positive electrode and negative electrode that constitute the elements for electromotive-force; apart from these the electrolyte and separator are also important. Improvements of these elements aimed at increasing battery energy density are currently being made in an extremely active fashion.

Another aspect, which used to be overlooked, is the battery casing, i.e., the metal outer can of the battery, which accommodates these elements for electromotive-force. However, in recent years this has been re-evaluated as an important problem and improvements are actively being sought.

If the outer can of the battery can be made thinner, it is possible to accommodate more battery active material in such a member that is thinner but having the same conventional shape, thereby enabling the volume energy density of the battery as a whole to be raised. Also, if the outer can of the battery can be made of lightweight material having a lower specific gravity, a reduction in weight for the same conventional shape can be achieved, thereby reducing the weight of the battery as a whole, and making it possible to raise the weight energy density of the battery as a whole.

The main conventional method of manufacturing battery cans (metal outer cans) was to manufacture the battery can having the prescribed shape by repeating a plurality of deep-drawing steps performed by a press machine (herein this is termed the "transfer drawing method"). However, the DI (drawing and ironing) method has attracted attention as a technique that should be particularly mentioned in connection with the manufacture of battery outer cans, whereby a further reduction in thickness of the battery can be achieved and the volume energy density raised, and also as a technique whereby productivity may be further improved. Specifically, conventionally drawing was usually employed for battery can manufacture, but advantages are obtained by the DI (drawing and ironing) method, in which both drawing and ironing are employed (see Published Japanese Patent No. H.7-99686).

This DI method is a method in which, as is known by Published Japanese Patent No. H.7-99686 etc., a cup-shaped intermediate product is manufactured by a deep drawing step by a press machine, and a battery can having a cylindrical shape having a bottom of prescribed shape is manufactured continuously in a single step from this cup-shaped intermediate product by an ironing step using an ironing machine. In comparison with the "transfer drawing method" it has the advantages of improving productivity due to a decrease in the number of steps, a reduction in weight and an increase in capacity due to decreased thickness of the can side circumferential wall, and reduction in stress corrosion. Its use is therefore increasing. Conventionally, in this method of manufacture, nickel-plated steel sheet having a comparatively high hardness was employed for the battery can blanks, in order to ensure sufficient pressure-resistant strength of the battery can and sufficient strength of the sealing aperture. This DI method makes it possible to reduce the thickness of the battery outer can and makes it possible to achieve an improvement in the volume energy density of the battery of about 2~5%.

Although there is some variability depending on battery size, materials used, and method of manufacturing the battery can etc., the weight ratio occupied by the metal outer can in the weight of the battery as a whole in batteries that have been actually used previously is about 10 to 20 wt. % in the case of a cylindrical nickel-hydrogen rechargeable battery or lithium ion secondary battery and, in the case of a prismatic nickel-hydrogen rechargeable battery or lithium ion secondary battery, at about 30 to 40 wt. %, this has a value about twice that for the cylindrical type. In particular, this value was high for the prismatic type in view of the difficulty of ensuring pressure withstanding strength of the battery can.

Such movement to miniaturization and weight reduction of battery casings, i.e., the metal outer can of the battery, is effective in raising battery energy density, as described above, but in actual battery use involving charging, discharging or leaving to stand etc., as well as energy density reliability of quality and safety are important and cannot be ignored. In the case of primary batteries which are used for discharge only, guaranteed capacity and prevention of liquid leakage even when stored for a long period, as well as reliability of quality such as a stable discharge characteristic are indispensable. In the case of secondary batteries that undergo repeated charging and discharging, in addition to the characteristics required for primary batteries, properties such as cycle life and safety are even more important.

Conventionally, in regard to these battery metal outer cans, it was extremely difficult to satisfy requirements for both higher energy density and product quality and safety. Specifically, when it was attempted to increase energy density by some method involving the metal outer can of the battery, it was found that batteries deformed or cracks were produced under abnormal conditions, resulting in frequent occurrence of problems such as leakage of electrolyte. On the other hand, if the metal outer can was made strong, an improvement in energy density was often sacrificed; an effective method of improving the trade-off relationship of these two could not be found.

In the process of manufacturing battery cans indicated above, a method using the DI process involving drawing and ironing is excellent in that it reasonably satisfies demands for increasing the energy density of batteries by making the batteries with a small thickness and light weight and also both quality reliability and safety of the batteries. However, in this respect, improvements such as further increase in performance and quality reliability and stability were sought.

There is a strong market demand for increased convenience of such primary batteries and secondary batteries, i.e., for battery miniaturization and weight reduction. On the other hand, quality reliability and safety of such batteries are indispensable. Conventionally, both quality reliability and safety and the improvement in battery energy density that makes possible miniaturization and weight reduction of batteries were insufficiently satisfied.

Also, if, in the process of manufacturing a metal outer can, extreme miniaturization and weight reduction were attempted, even if a method based on the DI process used for cylindrical batteries produced by drawing and ironing was employed, defects such as corrosion or cracks occurred in the metal outer can, which was not therefore fully satisfactory. Furthermore, in the case of prismatic batteries, which were conventionally manufactured by can drawing, there were problems regarding miniaturization and weight reduction of the metal outer can of the battery.

An object of the present invention is to mitigate the problems described above and, aiming at miniaturization and weight reduction of the metal outer can which has a cylindrical or prismatic or similar shape used in a primary or secondary battery, to provide a battery of improved battery energy density and satisfying battery quality reliability and safety.

SUMMARY OF THE INVENTION

The present invention is generally a battery wherein the primary component of the blank material of the metal outer can is iron, and a nickel layer is provided on at least the inside face of this battery, and a method of manufacturing the battery. More specifically, one embodiment of the invention is a battery wherein the elements for electromotive-force are accommodated in a metal outer can, the metal outer can being a metal can with a bottom having a cylindrical, prismatic or similar shape and having a ratio of bottom thickness/side thickness of 1.5~7.0, this metal outer can containing primarily iron. A nickel layer is provided on at least the inner face of the battery, and a plurality of shallow grooves perpendicular to the bottom face are formed on the surface of this nickel layer.

Further, one embodiment of the invention is a method of manufacturing a battery wherein an iron-based metal sheet formed with a nickel layer on at least one face is subjected to drawing forming into a tubular shape having a bottom, and ironing processing (DI processing) is performed continuously in a single step such that the ironing ratio (where the ironing ratio (%) is defined as follows: ironing ratio (%)=(original thickness—thickness after ironing)×100/original thickness) of the side part of the can formed in said tubular shape having a bottom is in the range 20~90%; a metal outer can having a ratio of the bottom thickness/side thickness of 1.5~7.0 and having a cylindrical, prismatic or similar shape formed with several shallow longitudinal grooves in the nickel layer is manufactured, and a battery is constituted using this.

BRIEF DESCRIPTION OF THE DRAWINGS

FIGS. 6, 6A, 6B, 6C and 6D are cross-sectional views of a metal outer can of prismatic shape having a bottom employed in an embodiment of the present invention, and a detail of a corner part thereof, to a larger scale.

DETAILED DESCRIPTION

Figure 1:
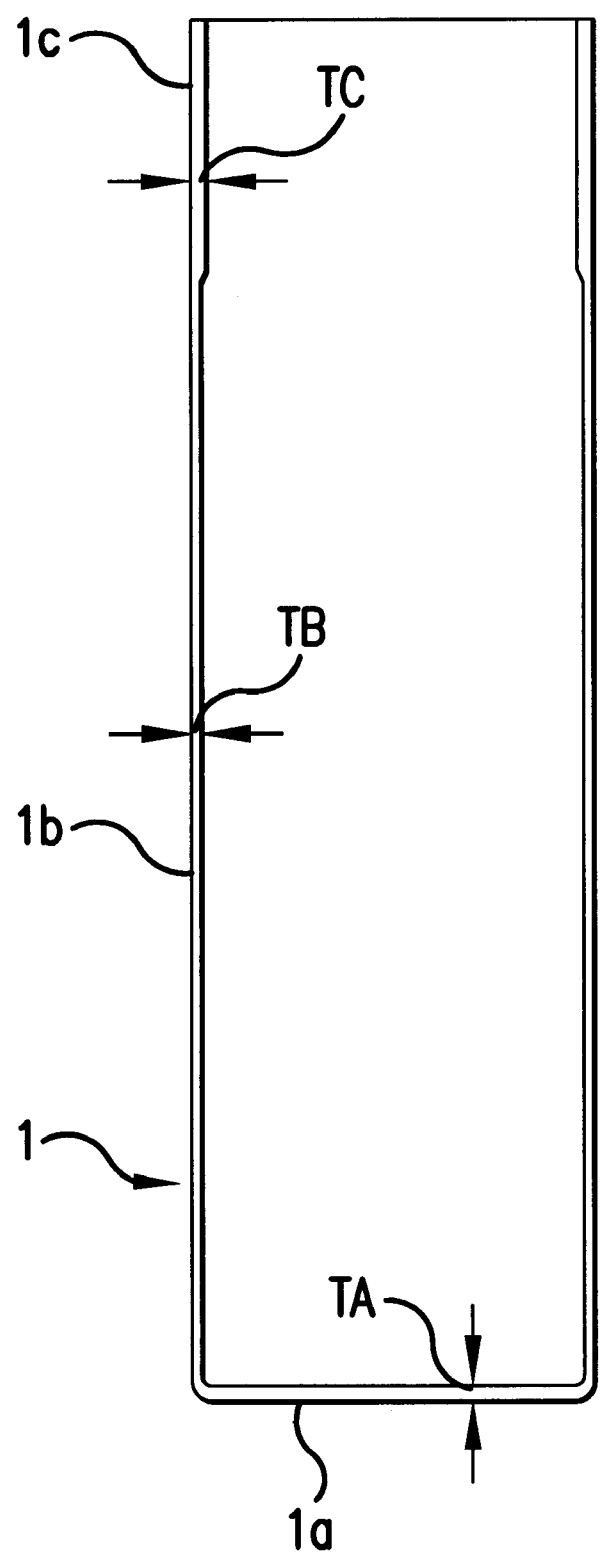
FIG. 1 is a cross-sectional view of a metal outer can of cylindrical shape having a bottom used in an embodiment of the present invention.

In a battery according to the present invention, the elements for electromotive-force are accommodated in a metal outer can, the metal outer can being a metal can with a bottom having a cylindrical, prismatic or similar shape and the ratio of the thickness of the bottom wall to the thickness of the side wall being 1.5~7.0, this metal outer can primarily containing iron. A nickel layer is provided on at least the inner face of the battery, and a number of shallow grooves perpendicular to the bottom face are formed on the surface of this nickel layer.

In this case, it is particularly desirable that the ratio of the bottom thickness/side thickness of the metal outer can should be 2.5~5.0. It is further preferable that the depth of the multiplicity of shallow grooves perpendicular to the bottom face formed in a nickel layer of no more than 20 m should be at least 0.5 m but less than the thickness of this nickel layer, and that the metallic material, whose chief constituent or primary component is iron, should be carbon steel for cold rolling containing 0.1 wt. % or less of carbon (C), and preferably carbon steel containing up to 0.1 wt. % of at least one of titanium (Ti) or niobium (Nb).

Batteries obtained using a metal outer can as above may have the following characteristic advantages in comparison with conventional batteries.

Specifically, since a nickel layer is provided on the battery inside face of the metallic material whose primary component is iron, which is comparatively cheap and of excellent strength, and shallow grooves are formed perpendicular to the bottom face in the surface of this nickel layer, the characteristic advantages can be obtained that: (1) there is the benefit that, as a result of the formation of the shallow grooves perpendicular to the bottom face, the contact resistance with the elements for electromotive-force accommodated within the battery can be greatly reduced and (2) in view of the formation of the shallow grooves perpendicular to the bottom face in the nickel layer, a construction can be achieved in which the layer whose primary component is iron is not in direct contact with the elements for electromotive-force, so that, whichever battery system this is applied to, excellent resistance to corrosion is obtained. It should be noted that, in addition to this, the benefit is newly added that a high ironing ratio can be achieved by DI processing, which could not be achieved conventionally, in view of the results obtained from the benefits (1) and (2). By this means, in a battery having a cylindrical shape, prismatic shape or a shape similar thereto, a metal outer can may be provided wherein the ratio of the bottom thickness/side thickness is 1.5~7.0. Although some conventional cylindrical batteries were encountered in which the ratio of the bottom thickness/side thickness was similar to this, according to the present invention, the benefit is obtained that the quality reliability and safety of the battery can be greatly increased, while a ratio of the bottom thickness/side thickness which is equal to or superior to the conventional value can be obtained.

Also, although conventionally in the case of batteries having a prismatic shape or shape similar thereto, batteries in which a high ironing ratio was obtained by DI processing could not be obtained, with the present invention it is now possible to provide a metal outer can having a ratio of the bottom thickness/side thickness of 1.5~7.0 even in the case of batteries having a prismatic shape or shape similar thereto.

In one particular embodiment of a metal outer can for a battery according to the present invention, an HV value of the side wall of the metal outer can after molding of the metal outer can is 1.5 times or more than the HV value indicating the Vickers hardness of the metallic material whose primary component is iron that constitutes the blank material before use, whereby the processing hardening value of the metal outer can is specifically defined. As used herein, "HV value" refers to the Vickers hardness value.

Also, in another embodiment, the thickness of the side wall of the metal can in the vicinity of the sealing aperture of the battery is at least 10% greater than the side thickness in other parts. This is because when the battery is used, the main weakness in regard to pressure withstanding strength when the pressure within the battery rises is in the vicinity of the battery sealing aperture. It is therefore possible to maintain the sealing strength by making the side thickness in the vicinity of the battery sealing aperture, which is inferior in its ability to withstand pressure, at least 10% thicker than the side thickness in other portions. The benefit of the invention can be further emphasized by making the side thickness in the vicinity of the battery sealing aperture at least 30% more than the side thickness of other parts, in the case where the metal outer can is in particular of cylindrical shape of external diameter under 35 mm.

Furthermore, in another embodiment of the present invention, a further improvement in energy density of the battery can be achieved by reducing the thickness of the side wall of the metal outer can to a range of 0.05~0.15 mm, which was conventionally unavailable.

In a battery in accordance with another embodiment of the invention, the elements for electromotive-force are accommodated in a metal outer can, this metal outer can being a metal can with a bottom having a prismatic shape or shape similar thereto, with a ratio of the bottom thickness/side thickness of 1.5~7.0, this metal outer can primarily containing iron and having a nickel layer on at least the battery inside face. The surface of this nickel layer is formed with a plurality of shallow grooves perpendicular to the bottom face. At least the corner portion on the battery inside face in the longitudinal cross-sectional plane and transverse cross-sectional plane of this metal outer can has a curved shape with a radius less than 0.5 mm. By this means, even if the ratio of the bottom thickness/side thickness of the battery can is raised, i.e., even if the side thickness is made thinner, pressure withstanding strength of the battery can be maintained. In view of the prismatic shape of the metal can, the side wall has a plurality of planar faces, a corner being formed at each intersection of the bottom wall and each side face and between adjoining side faces.

In a method of manufacturing a battery in accordance with the invention, an iron-based metallic sheet formed with a nickel layer on at least one face is subjected to drawing forming into a tubular shape having a bottom, continuous ironing processing being performed such that the side of the can formed in this tubular shape has an ironing ratio in the range of 20%~90% and a metal outer can being thereby manufactured having a bottom thickness/side thickness ratio of 1.5~7.0, having a cylindrical shape, prismatic shape or shape similar thereto, and with a plurality of shallow longitudinal grooves being formed in the nickel layer provided on the battery inside face. Even more preferably, ironing processing is performed continuously in a single step such that the ironing ratio is in the range 50~90%. In view of this high ironing ratio, with this invention, the benefit is obtained that a metal outer can may be manufactured having a bottom thickness/side thickness ratio of 1.5~7.0. Next, specific examples of the present invention will be described.

The embodiments of the invention will now be described in greater detail.

In a first embodiment of a battery according to the present invention, a cylindrical nickel-hydrogen rechargeable battery will be described as one example of a battery wherein the material of the metal outer can is principally iron and wherein a nickel layer is provided on at least the battery inside face.

Figure 2:
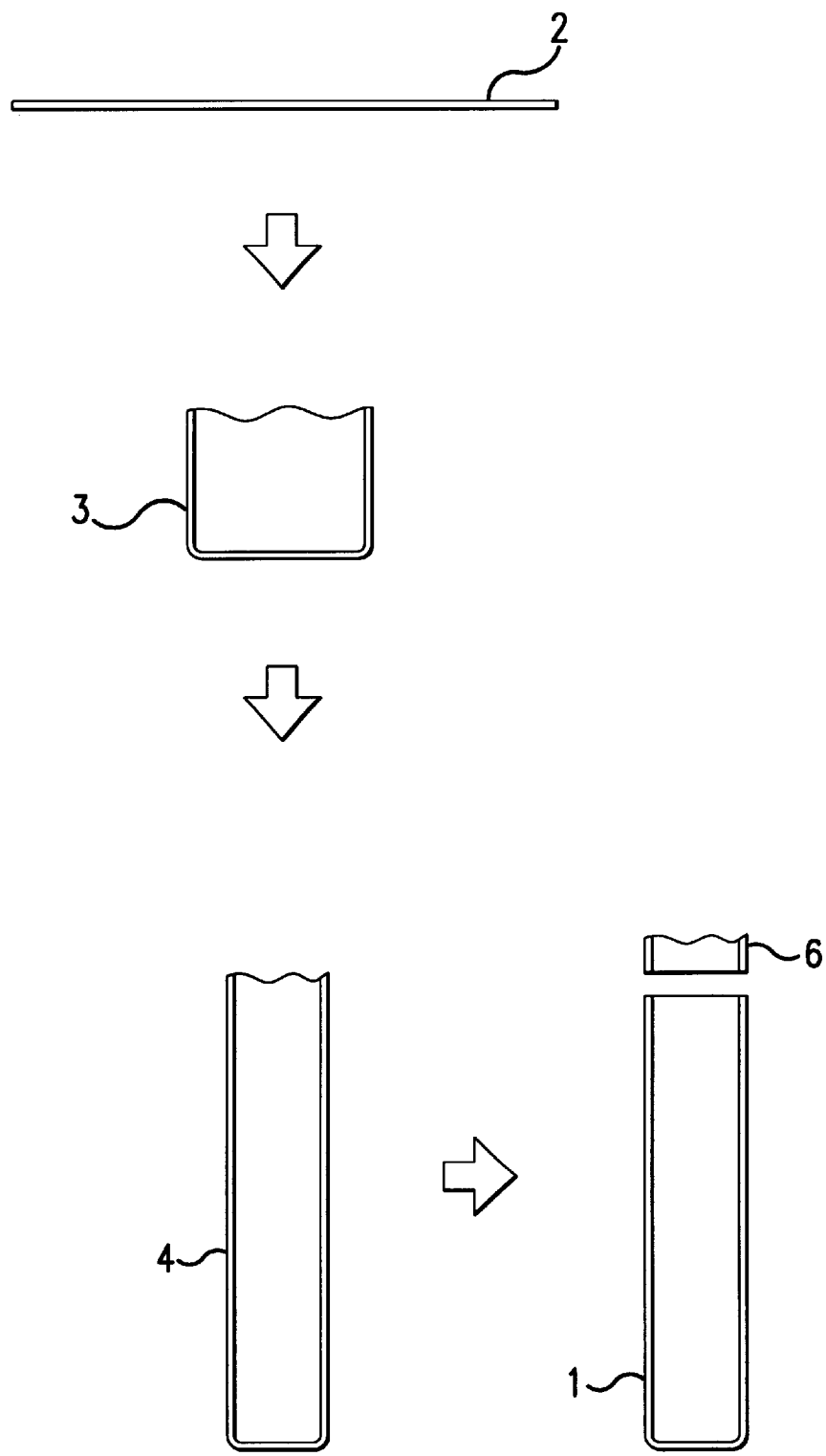
FIG. 2 is a diagram of the process up to manufacture of a DI metal outer can from the blank material used in an embodiment of the present invention.

First, a metal outer can used in this battery will be described. As shown in FIG. 2, as blank material nickel-plated steel sheet 2 was employed, obtained by nickel plating both sides of aluminum-killed steel sheet SPCE (carbon content 0.04 wt. %) with about 3.5 micron of nickel, and subjecting this to heat treatment to obtain a sheet having a thickness of 0.4 mm. This nickel-plated steel sheet was punched out to a circular shape and then subjected to drawing using a press to manufacture a metal can cup 3 having a bottom with an external diameter of 21.5 mm and height of 15.5 mm. There is little change in the bottom thickness or side thickness in the shape of this cup 3 compared with the blank material. Further, this metal outer can cup 3 provided with a bottom was introduced into a DI metal mold and a DI metal can 4 having a bottom with an external diameter of 13.8 mm and height of 54.0 mm was manufactured by continuous ironing. In this condition, the side top portion (lug) of the metal can was not flat but had a somewhat distorted shape due to the processing, so lug 6 of the side top portion was cropped to produce a metal outer can 1 with an external diameter of 13.8 mm and a height of 49.0 mm. FIG. 1 shows a cross-sectional view of this metal outer can 1.

The bottom thickness (TA) of bottom portion or wall 1a of this metal outer can 1 of cylindrical shape with a bottom shown in FIG. 1 is 0.4 mm, while the side thickness (TB) of side wall portion 1b is 0.18 mm, the ironing ratio being 55%. Also, the ratio of bottom thickness (TA)/side thickness (TB) is 2.22. It should be noted that the side thickness (TB) indicated here is the side thickness at intermediate height of metal outer can 1 and indicates a mean value of the side thickness.

Metal outer can 1 was manufactured such that the side thickness at a position 5 mm below the aperture of the top 1c in metal outer can 1, constituting a portion in the vicinity of the sealing aperture (herein this is called the side thickness TC in the vicinity of the sealing aperture) was 0.2 mm, i.e., about 11% thicker than the side thickness (TB) of the intermediate portion, with the object of increasing the strength of the sealing aperture. Thus, the thicker top portion 1c is about 10% of the height H of the metal can 10 (5 mm/49 mm).

The HV value indicating the Vickers hardness of the nickel-plated steel sheet prior to processing of this metal outer can 1 was 108; the HV value of the side wall portion (1b) after formation of the metal outer can was 202; the HV value being thus increased 1.87 times by DI processing.

According to the present invention, in the DI can manufacturing step in which continuous ironing processing was performed, shallow grooves perpendicular to the bottom face are formed. These shallow grooves perpendicular to the bottom face in the battery inside face are the mold scratch marks in the DI can manufacturing step. Such scratch marks can be formed by introducing comparatively hard particles such as of alumina during DI processing. Specifically, adopting the method of introducing alumina, by mixing for example alumina particles in the plating bath in the nickel plating treatment step, the alumina particles that then become present in the plating in small amount can easily form a plurality of shallow grooves perpendicular to the bottom face.

Figure 3:
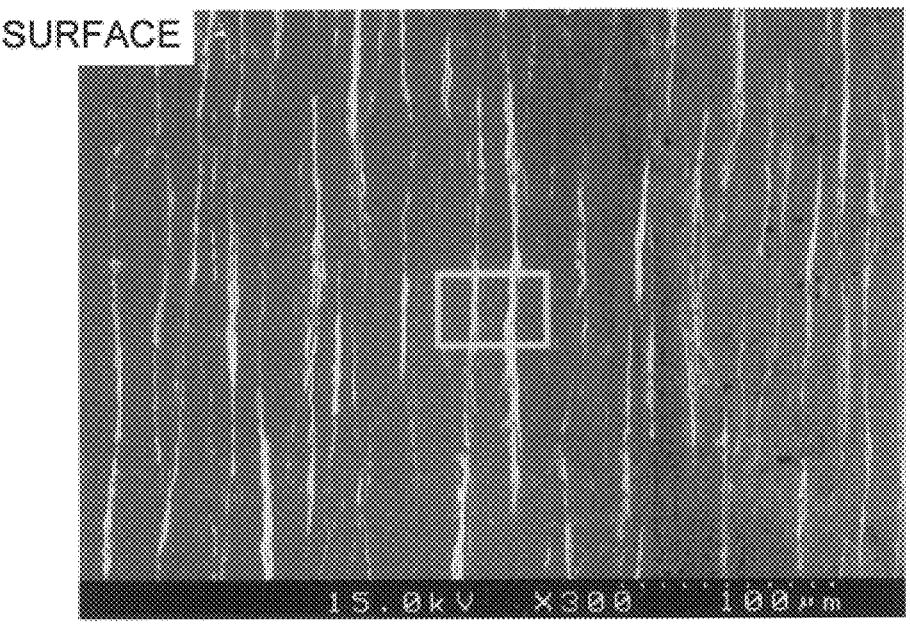
FIG. 3 shows photographs taken using a scanning electron microscope of the metallic structure showing with a magnification factor of 300 times and 3000 times the side wall surface of a metal outer can according to the present invention on the side facing the interior of the battery.
Figure 3:
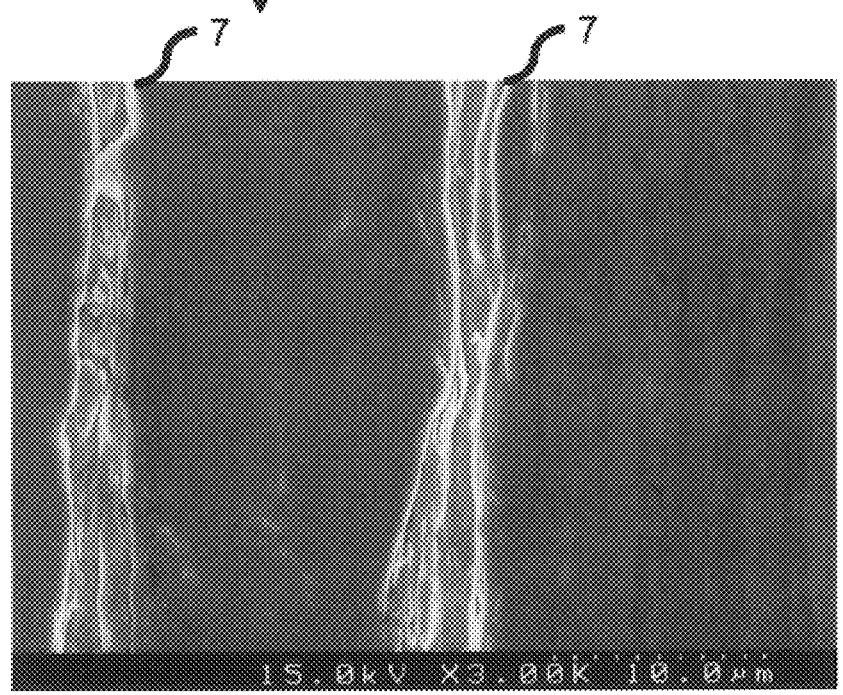
Figure 4:
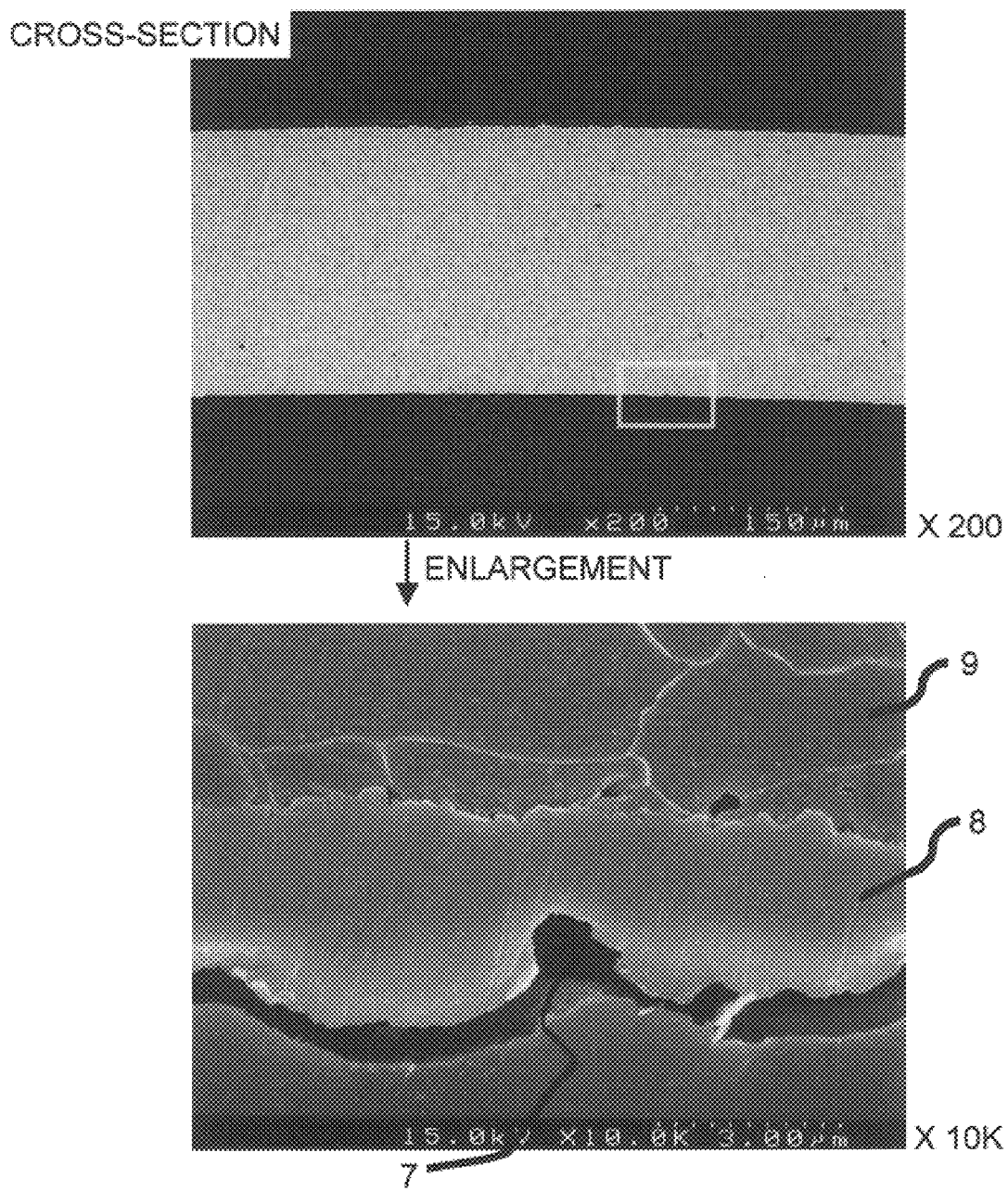
FIG. 4 shows photographs taken using a scanning electron microscope of the metallic structure shown with a multiplication factor of 200 times and 10000 times of the cross-sectional surface of the side wall of a metal outer can according to the present invention.

FIG. 3 and FIG. 4 show photographs taken using a scanning electron microscope showing this condition. FIG. 3 shows photographs taken with a scanning electron microscope in which the battery inside face of the metal outer can is magnified 300 times and in which the aperture region is further magnified 3000 times. The white longitudinal stripes in the photograph are the portions 7 of a plurality of shallow grooves perpendicular to the bottom face. FIG. 4 shows scanning electron microscope photographs of the cross-sectional surface of the metal outer can magnified 200 times and further of the aperture portion thereof magnified 10000 times; as shown by the photograph to a larger scale magnified 10000 times, in the nickel plating layer 8 of steel sheet SPCE material 9, a plurality of shallow grooves 7 having a depth of about 1 $\mu$m are formed in the battery inside face. In this manner, manufacture of a metal outer can used in a battery according to the present invention is completed.

Next, a cylindrical sealed nickel-hydrogen rechargeable battery was manufactured using the metal outer can manufactured as described above. Initially, the positive electrode and separator and negative electrode constituting the elements for electromotive-force were prepared. For the positive electrode, spherical nickel hydroxide powder and an additive such as zinc oxide, cobalt oxide, or cobalt hydroxide were mixed into the form of a paste, which was used to fill a sponge-like nickel conductive porous body, the electrode being constituted by forming to the prescribed dimensions (42 mm×75 mm×0.72 mm) by drying, pressurizing and cutting. Nickel metal leads were attached to this positive electrode plate such as to make it possible to connect with the positive electrode terminal of the battery. For the separator, polypropylene non-woven cloth that had been subjected to sulphonating treatment and had a thickness 0.12 mm was employed. For the negative electrode, a paste was constituted by adding a conductive agent and/or a bonding agent to alloy powder consisting of AB5 type MmNi 3.6 Mn 0.4 Al 0.3 Co 0.7 composition as a hydrogen-absorption alloy. This paste was applied on to a punching metal core member consisting of nickel-plated iron, and formed to the prescribed dimensions (42 mm×101 mm×0.44 mm) by drying, pressurizing and cutting, to thereby constitute the electrode.

Next, the positive electrode and negative electrode were wound in spiral fashion with the separator in between and accommodated in the aforementioned metal outer can. In this case, the outermost periphery of the negative electrode 8 were arranged to directly contact the metal outer can. After this, the positive electrode terminal constituted by the cap of the sealed battery was connected with the positive electrode plate by spot welding. An amount of 2.0 cc of an aqueous solution of potassium hydroxide (KOH) of specific gravity 1.30, in which was dissolved 40 g/l of lithium hydroxide (LiOH.H$_2$O), constituting the electrolyte, was introduced into the battery and a sealed battery was constituted by sealing the metal outer can and sealing cap by ordinary caulking sealing. This battery was of the AA size, its diameter being 14.5 mm, its height being 50.0 mm, and the battery weight being about 26 g. The battery had a capacity of 1350 mAh. This battery will be called cell A according to the present invention.

For comparison of performance with this cell A of the present invention, prior art example cells B~E were manufactured and evaluated. The differences of cells B~E from cell A of the present invention consisted in each case of different construction of the battery outer can, and were as follows.

First, cell B was constructed using the aluminum-killed steel sheet directly without any nickel plating, but a plurality of shallow grooves perpendicular to the bottom face were formed in its surface. Cell C had a nickel layer but was of a construction in which the shallow grooves perpendicular to the bottom face were absent from its surface. Cell D was an example in which the ration of the bottom thickness/side thickness of the metal outer can was less than 1.5, and employed a metal outer can having a bottom thickness/side thickness ratio of 1.14, the bottom thickness being processed to 0.4 mm, while the side thickness was processed to 0.35 mm. The ironing ratio of this metal outer can was 12.5%, which was lower than that of the present invention, with the result that the HV value of the side wall after formation of the metal outer can was low, at 124, and could only be raised 1.15 times by processing. Cell D therefore differed from the present invention not only in that the relationship of the bottom thickness/side thickness was outside the range of the present invention but also in that the change of HV value produced by processing was less than 1.5 and in that the ironing ratio was less than 20%.

Cell E was a battery employing carbon steel containing 0.11 wt. % carbon.

The discoveries obtained by evaluating the performance of these cells A through E with metal outer cans manufactured as above were as follows.

Cell A according to the present invention had a battery performance enabling it to be supplied as a nickel-hydrogen rechargeable battery and possessed excellent performance in respect of all of the charging characteristic, the discharge characteristic, the cycle life characteristic, and the storage characteristic; apart from this, it was a battery in which both the targeted high energy density of the battery and high reliability could be obtained simultaneously. More details concerning the performance of cell A will be given during the description of the prior art cells B through E.

Cell B was a battery in which the aluminum-killed steel sheet was used directly without nickel plating, but in which the metal outer can was subjected to formation of a plurality of shallow grooves perpendicular to the bottom face in its surface. However, in this case, drawing and ironing processing in the process of manufacturing the metal outer can did not necessarily proceed smoothly, and forming defects were found to be more easily produced than in the present invention. Regarding the actual characteristics of the battery, problems occurred in regard to all of the charging characteristic, discharging characteristic, cycle life characteristic and storage characteristic, with the result that it was found that its constitutional conditions were not such as to enable it to be practically used. It was inferred that this was because of progress of corrosion of the metal outer can by the alkali electrolyte, in light of the absence of a nickel layer on the steel sheet.

Figure 5:
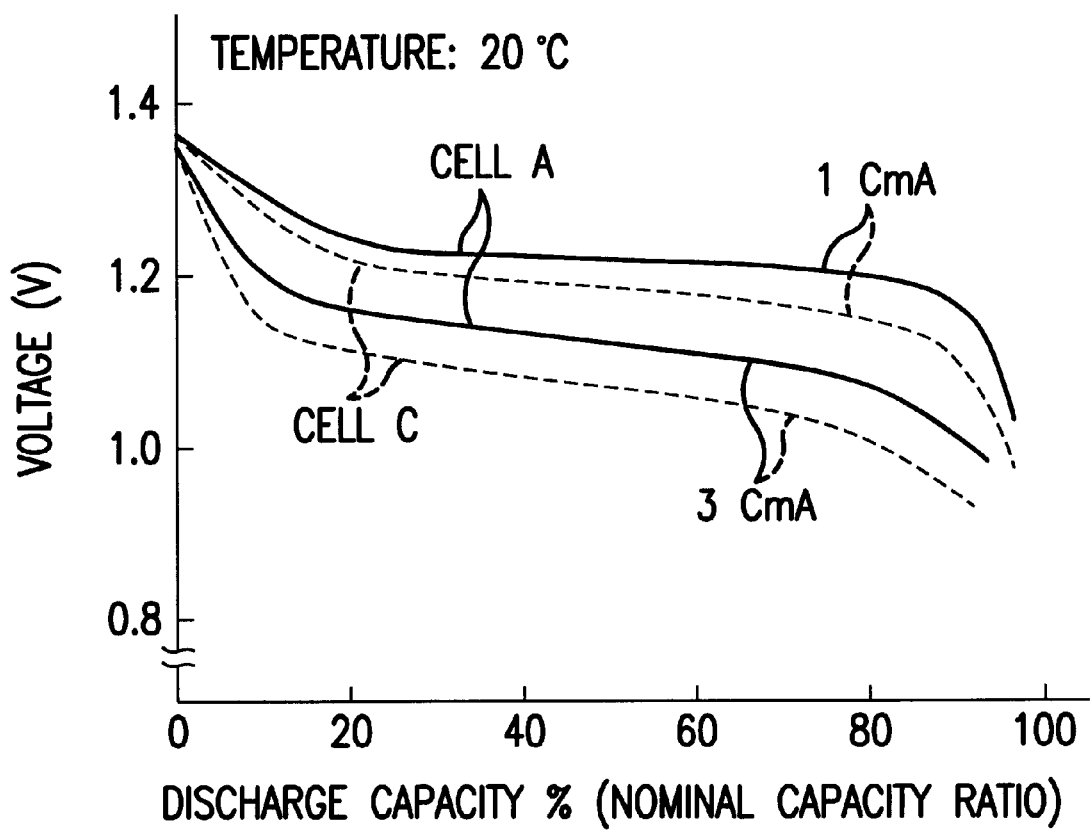
FIG. 5 is a view comparing the high rate (1 CmA, 3 CmA) discharge characteristics at 20 C of a cell A according to the present invention and a prior art cell C.

In contrast, cell C had a construction wherein a nickel layer was provided but a plurality of shallow grooves perpendicular to the bottom face were not formed in the surface. In this case, although there were no particular problems in the production process of the metal outer can, and, regarding the actual characteristics of the battery excellent characteristics were displayed equivalent to those of cell A with respect to the charging characteristic, the cycle life characteristic and the storage characteristic, a difference was found in comparison with cell A with respect to the discharge characteristic, in particular the discharge voltage under high-rate discharge. FIG. 5 is a view showing a comparison of the characteristics under high-rate (1 CmA, 3 CmA) discharge at 20 C. As can be seen from FIG. 5, at intermediate discharge voltage for 1 CmA, the discharge voltage of cell C was about 30 mV lower than that of cell A and at 3 CmA this difference had widened to about 50 mV. This implies a capacity drop of about 2.5% in terms of Wh even for what, in terms of high-rate discharge, is the comparatively gentle rate of 1 CmA. In recent years, nickel-hydrogen rechargeable batteries have come to be a type of battery in which a high-rate discharge characteristic is particularly prized and applications have gradually expanded in the direction of higher-rate discharge from 5 CmA, 10 CmA to 20 CmA, and that a battery should have an inferior high-rate discharge characteristic at the 1 CmA level represents quite a serious problem.

Further, regarding cell D, since the side wall of the metal outer can was processed to a thickness of 0.35 mm, although the HV value of the side wall was comparatively low, no problems occurred regarding the pressure withstanding strength. However, in the case of cell D, since its side thickness of 0.35 mm was about twice that of the present embodiment, in which the side thickness was 0.18 mm, the effective volume within the battery was reduced by about 5%, with the result that the problem arose of a 5% drop of battery energy density.

Next, cell E was a battery using a metal outer can employing carbon steel of carbon content 0.11 wt. %. However, in this case, drawing and ironing working were difficult, making processing of the outer can difficult to perform. As a result, it was difficult to obtain a metal outer can having characteristics such as the ratio of the bottom thickness to the side thickness being 2.22, as in the present embodiment.

Consequently, whereas the prior art cells B through E have problems regarding difficulty of manufacture of the metal outer can and/or battery characteristics, only cell A according to the present invention had excellent characteristics in respect of all of the charging characteristic, the discharge characteristic, the cycle life characteristic and the storage characteristic, and thus constituted a battery in which both the targeted high battery energy density and high reliability could be simultaneously achieved.

An embodiment of a battery according to the present invention wherein the material of the metal outer can is primarily iron and which is constructed with a nickel layer provided on at least the battery inside face will be described with reference to an example in which it is implemented in a prismatic lithium ion secondary battery.

First, the metal outer can used in this battery will be described. As the blank material, nickel-plated steel sheet of thickness 0.4 mm was employed, which was obtained by subjecting both sides of aluminum-killed steel sheet SPCE to nickel plating of about 3.5 micron, followed by heat treatment. This nickel plated steel sheet was first punched to rectangular shape and a metal can cup having a bottom was manufactured by drawing processing using a press. Little change in the bottom thickness and side thickness of this cup from those of the blank material was found.

Next, this metal can cup having a bottom was introduced into a DI mold and a metal can having a bottom and having the external dimensions: width P 22 mm, height 52 mm and thickness (Q) 8 mm, was manufactured by continuous ironing processing. Since, in this condition, the upper parts of the sides (lugs) of the metal can having a bottom were not flat, but presented a somewhat distorted shape due to processing, the side upper parts were cropped to obtain a metal outer can 10 of height H 48 mm shown in FIG. 6. The bottom thickness (TA) of this metal outer can was 0.4 mm, while its side thickness (TB) was 0.2 mm, representing an ironing ratio of 50%. Also, the ratio of bottom thickness/side thickness was 2.0. The side thickness (TB) indicated here is the side thickness at intermediate height of metal outer can 10 and indicates a mean value of the side thickness.

The metal outer can was manufactured such that the side thickness (TC; this will be termed the side thickness in the vicinity of the sealing aperture) at a position 5 mm below the aperture at the top 10c which is the region in the vicinity of the sealing aperture in metal outer can 10 is about 25% thicker, at 0.25mm, than the side thickness (TB) of the intermediate portion 10b, with the object of increasing sealing strength. The intermediate portion 10b is between the bottom wall and the thicker, top portion 10c. As shown in FIG. 6A, the planar portions of the side wall have a uniform thickness around the sealing aperture. FIG. 6B is an enlarged view of the portion designated 6B in FIG. 6A. FIG. 6C is a side view of the metal outer can 10. FIG. 6D is an enlarged view of the portion designated 6D in FIG. 6.

The HV value indicating the Vickers hardness of the nickel plated steel sheet prior to processing this metal outer can was 108; the HV value indicating the Vickers hardness of the side wall portion 10b after molding of the metal outer can was 186; thus the HV value was increased 1.72 times by DI processing.

According to the present invention, shallow grooves perpendicular to the bottom face are formed on the battery inside face in this DI can manufacturing step in which ironing processing is continuously performed. The shallow grooves perpendicular to the bottom face in the battery inside face are the mold scratch marks in the DI can manufacturing step. As in the first embodiment above, scratch marks can easily be formed by alumina particles. Also, the R of the corner portions on the battery inside face produced by the metal mold in the DI can manufacturing step, i.e., the corners present at the bottom face and the side face, and of the corners present between adjacent side faces is 0.4 mm. This condition is shown with reference to the longitudinal cross-sectional view and transverse cross-sectional view in FIG. 6.

Normally in the case of a prismatic battery increasing this R value increases the effective pressure withstanding strength. However, in order to maintain effective pressure withstanding strength under restrictions in regard to effective volume and in order to effectively accommodate the elements for electromotive-force, it is important to have a radius of curvature of no more than 0.5 mm. In the present invention, as shown in FIG. 6, the R (radius of curvature) of these corner portions is 0.4 mm. Pressure withstanding strength can thus be maintained even though the metal outer can is reduced in thickness. Manufacture of metal outer can 10 used in a battery according to the present invention is completed by the above processes.

Next, a prismatic lithium ion secondary battery was manufactured using a metal outer can manufactured as above. Initially, the positive electrode and separator and negative electrode constituting the elements for electromotive-force were prepared. For the positive electrode, $LiCoO_2$, a conductive agent containing acetylene black, and a fluorine resin binder etc. were mixed into the form of a paste, which was applied to an aluminum foil plate, and formed to the desired dimensions by drying, pressurizing and cutting to constitute the electrode. A lead wire was attached to this positive electrode plate to make it possible to connect it with the positive electrode terminal. For the separator, polyethylene porous film of thickness 0.027 mm was employed. For the negative electrode, styrene butadiene rubber (SBR) adhesive and carboxymethyl cellulose (CMC) thickener were added to spherical graphite and applied to a copper foil substrate, and formed to the prescribed dimensions by drying, pressurizing and cutting to constitute the electrode.

The positive electrode and negative electrode were then wound in spiral fashion with the separator in between and accommodated in the aforementioned metal outer can. After this, a cap portion constituting the positive electrode terminal of the sealed battery and the positive electrode plate were joined by an aluminum lead, and the negative electrode terminal of the metal outer can and the negative electrode plate were joined by a nickel lead.

As the electrolyte, ethylene carbonate (EC) and diethyl carbonate (DEC) were blended in a molar ratio 1:3 and used to dissolve lithium hexafluoro phosphate ($LiPF_6$) in a concentration of 1 mol/l. This electrolyte was poured into the battery and the metal outer can and sealing cap were sealed by ordinary laser sealing to constitute a sealed battery. This battery had a prismatic shape with a width of 22 mm, height of 48 mm, and thickness of 8 mm and the battery weight was about 18 g. The battery had a capacity of 610 mAh. This battery will be referred to as cell F according to the present invention.

For comparison of battery performance with this cell F of the present invention, a prior art example designated cell G was manufactured and evaluated. The differences of cell G from cell F of the present invention relate to a different construction of the metal outer can.

Specifically, for cell G, aluminum alloy sheet (3003) with manganese in solid solution was employed. Batteries such as cell G in which aluminum alloy is employed in the outer can of a lithium ion secondary battery currently hold the limelight as batteries intended to have light weight, but, in order to ensure performance equivalent to that of cell F in regard to pressure withstanding strength, in the case of cell G, the side thickness of the metal can having a bottom must be at least 0.5 mm and a side thickness of 0.5 mm was therefore chosen. When the external dimensions of this cell were made the same as cell F and the positive electrode, negative electrode, separator and electrolyte were made the same as those of cell F, the result was that the battery weight was about 18 g and the battery capacity was 550 mAh.

When comparing the electrical characteristics of these two batteries, no difference was found between them; both had excellent characteristics in terms of performance. However, when comparing the energy densities of the batteries, cell F according to the present invention had a volume energy density of 260 Wh/l and a weight energy density of 122 Wh/kg. Thus, in relation to the 234 Wh/l and 110 Wh/kg of cell G, it can be seen that cell F was much superior to the prior art cell G by 11% in terms of volume energy density and by 11% also in terms of weight energy density, respectively.

Consequently, although it might appear at first sight that the use of lightweight aluminum material for the battery casing would enable a weight reduction of the battery, even though, according to the present invention, a comparatively heavy iron-based material is employed, even higher battery energy density can be achieved in view of the introduction of a high ironing ratio in processing in order to obtain a high ratio of the bottom thickness/side thickness ratio.

The above are embodiments of the present invention but a supplementary description is provided below concerning aspects of the description of the above embodiments to elaborate on the same.

The ratio of the bottom thickness/side thickness of the metal outer can whose primary component is iron according to the present invention is specified as 1.5~7.0. It might be desirable to have a higher ratio in order to reduce size and weight but if the ratio is made high there are concerns regarding quality reliability and safety and as a result of several tests it was found that a range up to 7.0 is satisfactory. Also, if this ratio is less than 1.5, the benefit in terms of raising battery energy density is insufficient. In particular, it was found that this invention can be effectively practiced in a range of 2.5~5.0 of the ratio of bottom thickness/side thickness.

Next, it is a characteristic of the present invention that a number of shallow grooves perpendicular to the bottom face should be formed in the surface of the nickel layer on the battery inside face of the metal outer can for the battery; the depth of these grooves however must always be less than the thickness of the nickel layer; grooves deeper than or equal to the thickness of the nickel layer must never be formed. It was previously known to form narrow longitudinal stripes for surface roughening of the battery inside surface of a metal outer can for a battery by the DI process (see for example Published Japanese Patent Number 2615529). However, in the present invention, a number of shallow grooves perpendicular to the bottom face are formed solely in the surface of the nickel layer of the battery inside face of a metal outer can for a battery. Thus, the present invention is superior in regard to the fact that, in contrast to the prior art, where the longitudinal stripes were formed, in some cases, right down to the iron-based material, its longitudinal stripes are formed exclusively in the nickel layer, so that problems such as corrosion of the metallic material are not experienced at all.

Furthermore, as a result of studies concerning the metallic material whose primary component is iron, it was found that in order to effectively practice the present invention, the iron-based blank material should be carbon steel for cold rolling containing 0.1 wt % or less of carbon (C), preferably carbon steel containing 0.1 wt % or less of at least one of titanium (Ti) or niobium (Nb). It was ascertained that, in regard to the carbon content and ease of ironing processing, lowering the carbon content improves ease of processing, and furthermore if the steel is carbon steel containing 0.1 wt % or less of at least one of titanium (Ti) or niobium (Nb), its ease of processing is increased.

If the metal outer can has a cylindrical shape with, in particular, an outer diameter of under 35 mm, then when the side thickness (TC) in the vicinity of the battery sealing aperture is made at least 30% thicker than the side thickness (TB) in the other portions, the benefits of the present invention can further emphasized. This is because pressure withstanding strength can be comparatively satisfactorily maintained in batteries having a cylindrical shape with an external diameter under 35 mm or a shape similar thereto even if the side thickness of the metal outer can is made quite thin. Rather, the location where problems occur in such batteries in regard to pressure withstanding strength is the vicinity of the battery sealing aperture. In order to improve the pressure withstanding strength of the vicinity of the sealing aperture of batteries in which such pressure withstanding strength is a problem, it is effective to make the side thickness in the vicinity of the battery sealing aperture thicker than the side thickness in other portions. By making it at least 30% thicker, it is possible to improve the balance of the whole by seeking thickness reduction of the metal outer can as a whole while yet ensuring necessary thickness of the vicinity of the battery sealing aperture which is important for pressure withstanding strength.

Moreover, with future increases in battery energy density, battery sizes continue to move in the direction of progressive miniaturization and reduction in overall thickness. In these circumstances, it is desirable to make the thickness of the side wall of the metal outer can as small as possible. With the DI process of the present invention, a technical response to such requirements is feasible and the result has been achieved that the side thickness in the range of 0.05~0.15 mm, below the 0.2 mm which was conventionally considered to be the limit with the transfer drawing process, is obtained. As such, the thickness of the side wall of the metal outer can may be reduced to a level that was previously unavailable, enabling batteries of even higher energy density to be realized.

Although in the embodiments described above the examples of a cylindrical nickel-hydrogen rechargeable battery and a prismatic lithium ion secondary battery were employed, the present invention can be applied instead of these to, for example, primary batteries such as alkali manganese dry batteries or lithium primary batteries, or polymer lithium batteries. In fact, the invention can be applied to primary batteries or secondary batteries wherein the metal can has a cylindrical shape, prismatic shape or shape similar thereto, so long as they are batteries in which the elements for electromotive-force are accommodated in a metal outer can.

By means of the present invention, in view of the formation of a number of shallow grooves perpendicular to the bottom face in the surface of a nickel layer on the inside face of a battery metal outer can, the contact resistance of the metal outer can and the elements for electromotive-force that are accommodated therein can be greatly reduced. Also, it is greatly superior in corrosion resistance in view of the formation of the shallow grooves perpendicular to the bottom face solely in the nickel layer. Thus, by exploiting such techniques, a metal outer can made using a high ironing ratio is obtained, making it possible to reduce battery weight and overall thickness and as a result, to achieve higher battery energy density. The present invention is therefore useful in achieving simultaneously both higher battery energy density and high reliability and safety.

What is claimed is:

1. A battery wherein elements for electromotive-force are accommodated in a metal outer can containing, primarily iron, said metal outer can comprising:
    a metal can having a bottom wall and a side wall defining a sealing aperture opposite said bottom wall, said metal can having a cylindrical or prismatic shape, a ratio of a thickness of said bottom wall of said metal can to a thickness of said side wall of said metal can being from 1.5 to 7.0, said side wall including a first portion extending around a circumference of said metal can adjacent said sealing aperture and a second portion extending around the circumference of said metal can between said first portion and said bottom wall, said first portion of said side wall of said metal can having a uniform thickness at least 10% greater than the thickness of said second portion of said side wall of said metal can; and
    a layer of nickel arranged on at least an inner face of said side wall, said nickel layer including shallow grooves arranged in a direction perpendicular to said bottom wall of said metal can, wherein said ratio of thickness of said bottom wall to said thickness of said side wall applies to both said first portion of said side wall and said second portion of said side wall, respectively.

2. The battery according to claim 1, wherein the ratio of the thickness of said bottom wall of said metal can to the thickness of said side wall of said metal can is from 2.5 to 5.0.

3. The battery according to claim 1, wherein said shallow grooves have a depth of at least 0.5 $\mu$m and less than a thickness of said nickel layer.

4. The battery according to claim 1, wherein said metal outer can is made of carbon steel for cold rolling containing 0.1 wt. % or less of carbon.

5. The battery according to claim 4, wherein the carbon steel contains 0.1 wt. % or less of at least one of titanium or niobium.

6. The battery according to claim 1, wherein the Vickers hardness of said side wall of said metal outer can after molding of said metal outer can is at least 1.5 times greater than the Vickers hardness of a blank material used to form said metal outer can prior to the molding of said metal outer can.

7. The battery according to claim 1, wherein said metal can has a cylindrical shape with an external diameter under 35 mm and the thickness of said first portion of said side wall is at least 30% greater than the thickness of said second portion of said side wall.

8. The battery according to claim 1, wherein the thickness of said first portion of said side wall and said second portion of said side wall of said metal can is in a range from 0.05 to 0.15 mm, respectively.

9. A battery wherein elements for electromotive-force are accommodated in a metal outer can containing primarily iron, said metal outer can comprising:

a metal can having a prismatic shape and including a bottom wall and a side wall defining a sealing aperture opposite said bottom wall, a ratio of a thickness of said bottom wall of said metal can to a thickness of said side wall of said metal can being from 1.5 to 7.0, said bottom wall and said side wall defining corners between said bottom wall and said side wall and between adjoining planar faces of said side wall, at least one of said corners having an inner radius of curvature less than 0.5 mm; and a layer of nickel arranged on at least an inner face of said side wall, said nickel layer including shallow grooves arranged in a direction perpendicular to said bottom wall of said metal can, wherein said side wall of said metal can includes a first portion extending around a circumference of said metal can adjacent said sealing aperture and a second portion extending around the circumference of said metal can between said first portion and said bottom wall, said first portion of said side wall of said metal can having a uniform thickness at least 10% greater than a thickness of said second portion of said side wall of said metal can, and said ratio of thickness of said bottom wall to said thickness of said side wall applies to both said first portion of said side wall and said second portion of said side wall, respectively.

10. A method of manufacturing a casing for a rechargeable or secondary battery comprising the step of drawing thereby forming an iron-based metallic sheet having a nickel layer on at least one face while performing continuous ironing processing in a single step to form an elongate, hollow can having a cylindrical or prismatic shape, a bottom wall, a side wall, an ironing ratio in a range from 20% to 90%, a ratio of a thickness of said bottom wall of said can to a thickness of said side wall of said can being from 1.5 to 7.0, and shallow longitudinal grooves formed in the nickel layer, wherein said side wall of said metal can includes a first portion extending around a circumference of said metal can adjacent said sealing aperture and a second portion extending around the circumference of said metal can between said first portion and said bottom wall, said first portion of said side wall of said metal can having a uniform thickness at least 10% greater than a thickness of said second portion of said side wall of said metal can, and said ratio of thickness of said bottom wall to said thickness of said side wall applies to both said first portion of said side wall and said second portion of said side wall, respectively.

11. The method of manufacturing a battery casing according to claim 10, wherein the ironing processing is performed continuously such that the ironing ratio is in a range from 50% to 90%.

12. The battery according to claim 1, wherein the height of said first portion of said side wall of said metal can is 5 mm.

13. The battery according to claim 1, wherein the height of said first portion of said side wall of said metal can is about 10% of the height of said metal can.

14. The battery according to claim 1, wherein the battery is a rechargeable or secondary battery.

15. The battery according to claim 1, wherein said metal can has a cylindrical shape such that said side wall is tubular.

16. The battery according to claim 1, wherein said metal can has a prismatic shape such that said side wall has a plurality of planar faces.

17. The battery according to claim 1, wherein said second portion is adjacent said bottom wall.

18. The battery according to claim 3, wherein the thickness of said nickel layer is less than or equal to 20 $\mu$m.

19. The battery according to claim 1, wherein said first and second portions of said side wall are adjacent one another.

20. The battery according to claim 9, wherein the height of said first portion of said side wall of said metal can is 5 mm.

21. The battery according to claim 9, wherein the height of said first portion of said side wall of said metal can is about 10% of the height of said metal can.

22. The battery of claim 9, wherein said side wall has a plurality of planar faces.

23. The battery according to claim 9, wherein all of said corners have an inner radius of curvature less than 0.5 mm.

24. The battery according to claim 9, wherein the battery is a rechargeable or secondary battery.

25. The method of manufacturing a battery casing according to claim 10, wherein the Vickers hardness of the side wall of the metal can after molding of the metal can is at least 1.5 times greater than the Vickers hardness of a blank material used to form the metal can prior to the molding of the metal can.

26. A battery in which elements for electromotive-force are accommodated in a metal outer can containing primarily iron, said metal outer can comprising:

a cylindrical metal can having a bottom wall and a tubular side wall, a ratio of a thickness of said bottom wall to a thickness of said side wall being from 1.5 to 7.0, an upper edge of said side wall being annular and defining a sealing aperture opposite said bottom wall, a thickness of said upper edge of said side wall being uniform and at least 10% greater than a thickness of another portion of said side wall; and a layer of nickel arranged on at least an inner face of said side wall, said nickel layer including shallow grooves arranged in a direction perpendicular to said bottom wall, wherein said ratio of thickness of said bottom wall to said thickness of said side wall applies to both said upper edge of said side wall and said another portion of said side wall, respectively.

* * * * *